United States Patent
Giat et al.

(10) Patent No.: US 10,430,316 B2
(45) Date of Patent: Oct. 1, 2019

(54) APPLICATION THREAD VISUALIZATION

(71) Applicant: ENTIT Software LLC, Sunnyvale, CA (US)

(72) Inventors: Hana Giat, Yehud (IL); Michael Seldin, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/573,967

(22) PCT Filed: May 21, 2015

(86) PCT No.: PCT/US2015/032010
§ 371 (c)(1),
(2) Date: Nov. 14, 2017

(87) PCT Pub. No.: WO2016/186676
PCT Pub. Date: Nov. 24, 2016

(65) Prior Publication Data
US 2018/0293154 A1   Oct. 11, 2018

(51) Int. Cl.
*G06F 11/36* (2006.01)
*G06F 9/48* (2006.01)
*G06F 11/00* (2006.01)

(52) U.S. Cl.
CPC ........... *G06F 11/3664* (2013.01); *G06F 9/48* (2013.01); *G06F 11/00* (2013.01)

(58) Field of Classification Search
CPC ......... G06F 9/48; G06F 11/00; G06F 11/3664
USPC ...................................................... 717/125
See application file for complete search history.

(56) References Cited

U.S. PATENT DOCUMENTS

| | | | |
|---|---|---|---|
| 7,272,820 B2 | 9/2007 | Klianev | |
| 7,689,989 B2 | 3/2010 | Dostert et al. | |
| 8,234,631 B2 | 7/2012 | Greifeneder et al. | |
| 8,856,767 B2 | 10/2014 | Jalan et al. | |
| 2006/0248401 A1 | 11/2006 | Carroll et al. | |
| 2007/0132667 A1* | 6/2007 | Han | G09G 3/293 345/60 |
| 2011/0099539 A1 | 4/2011 | Shafi | |
| 2011/0099550 A1* | 4/2011 | Shafi | G06F 11/3058 718/102 |
| 2011/0225592 A1 | 9/2011 | Goldin | |

(Continued)

OTHER PUBLICATIONS

Snajberk, J., Thread Monitoring Using Shared Memory, (Research Paper), May 2011, 61 Pages.

(Continued)

*Primary Examiner* — John Q Chavis

(57) ABSTRACT

Examples herein involve designating a first dimension of a thread visualization based on timing of a duration of a user action, the user action corresponding to a user interaction with an application; designating a second dimension of the thread visualization based on a number of threads of the application utilized for running tasks in response to the user action, the second dimension comprising a number of parallel timelines corresponding to the number of threads; determining locations for representations of the tasks within the appropriate parallel timelines of the thread visualization based on the timing of the tasks and the threads running the tasks; and rendering the thread visualization on a display.

20 Claims, 8 Drawing Sheets

(56) References Cited

U.S. PATENT DOCUMENTS

2012/0005457 A1   1/2012   Chen et al.
2014/0082592 A1   3/2014   Shafi

OTHER PUBLICATIONS

International Search Report and Written Opinion dated Feb. 4, 2016 for PCT Application No. PCT/US2015/032010 Filed May 21, 2016, 11 Pages.

* cited by examiner

APPLICATION THREAD VISUALIZATION

BACKGROUND

Parallel computing is a concept in computer programming or software that allows applications to run multiple tasks simultaneously. Parallelization is achieved using threads, where each thread runs in parallel with one another while running and handling application tasks asynchronously. Applications may include a main user interface thread and background threads (e.g., for network actions, blocking actions, etc.).

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
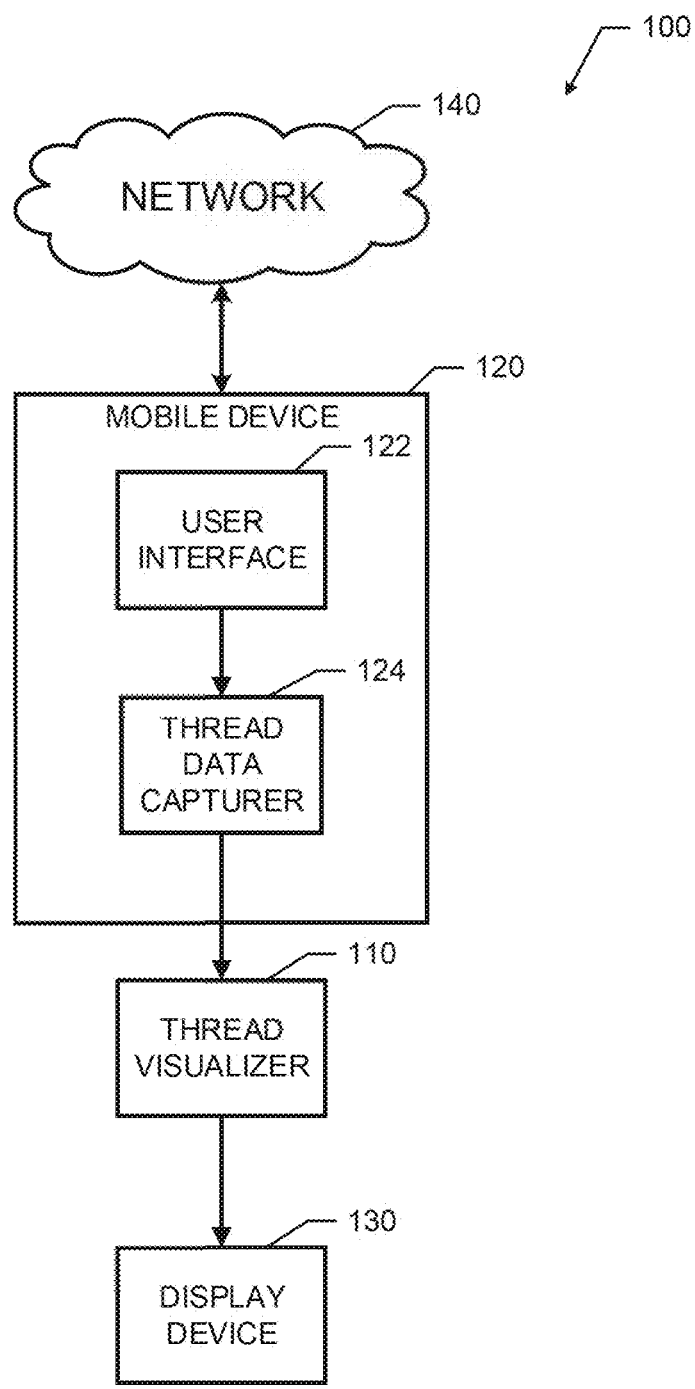
FIG. 1 is a schematic diagram of an example thread visualization system including a thread visualizer that may be implemented in accordance with an aspect of this disclosure.

Examples disclosed herein involve visualizing thread content and tasks run in application threads in response to a user action. As used herein, a user action refers to a user interaction with a user interface of a computing device (e.g., a mobile device, a computer, etc.) or an application on the computing device. A duration of a user action refers to a time period initiated by the user action at a first instance (e.g., request to load content) of the user interface that ends when the computing device reaches a second instance of the user interface (e.g., a completion of the loaded content). As used herein, a task corresponds to a string of application code that is asynchronously run or synchronously run on a thread of a corresponding application in response to a user interaction with the application (or user action). Examples disclosed herein visualize the measured and monitored duration of the user interaction by presenting characteristics of the duration such as a length of the duration, content of tasks executed in the duration, and locations (e.g., relative to time and thread) of the tasks within the duration. An example visualization may be rendered on a display or in a window of a display.

In parallel computing, users (e.g., application developers) cope with thread management to achieve smooth and high-performance execution. In mobile application development, operating systems frequently involve applications continuously executing multiple tasks (e.g., network actions, blocking actions, etc.) asynchronously. Accordingly, examples disclosed herein visualize characteristics of a duration of a user action to enable a user to identify characteristics of the duration of the user action, such as timing, content, and threads of tasks executed in response to the user action. Such a visualization may aid in identifying or detecting causes of issues or errors in application code. For example, using example visualizations involved herein, application developers may be able to identify tasks (e.g., network actions, blocking actions, etc.) in background threads causing delays in running tasks on a main thread of an application.

In examples disclosed herein, a thread timeline is generated for presentation to a user on a display device. The example thread timeline may include designated rows (or columns) corresponding to threads of an application, and the rows include representations (e.g., content blocks) identifying tasks running in the threads and the timing of the tasks in the timelines. The example representations may thus indicate a corresponding time, a thread, and content of the tasks within the rows that are representative of parallel timelines of the thread timeline.

Examples herein involve designating (e.g., labeling, assigning, establishing, etc.) a first dimension of a visualization based on timing of a duration of a user action, the user action corresponding to a user interaction with an application; designating a second dimension of the visualization based on a number of threads of the application utilized for running tasks in response to the user action, the second dimension comprising a number of parallel timelines corresponding to the number of threads; determining locations for representations of the tasks within the appropriate parallel timelines of the visualization based on the timing of the tasks and the threads running the tasks; and rendering the visualization on a display. In some examples, information (e.g., names, text, etc.) corresponding to running tasks, such as universal resource locators (URLs) or hypertext transfer protocol (HTTP) tasks of network actions, triggering tasks of blocking actions, etc. may be indicated in the visualization.

FIG. 1 is a schematic diagram of an example thread visualization system 100 including a thread visualizer 110 that may be implemented in accordance with an aspect of this disclosure. The example thread visualization system 100 includes the thread visualizer 110, a mobile device 120, including a user interface 122 and a thread data capturer 124, a display device 130, and a network 140. The example thread visualizer 110 displays a thread visualization on the display 130 based on thread data received from the mobile device 120 in response to a user action (e.g., a user interaction with the user interface 122, such as selecting an object, entering a request (e.g., via a mouse, keyboard, touchscreen, etc.), etc.)

The example mobile device 120 of FIG. 1 may be any mobile device (e.g., a smartphone, a tablet computer, a personal digital assistant (PDA), mp3 player, etc.) capable of running applications running tasks asynchronously or synchronously. The example mobile device 120 includes the user interface 122 and the thread data capturer 124. The example user interface 122 may include a graphical user interface (GUI), an input device (e.g., a keyboard, a mouse, a touchscreen, etc.), an output device (e.g., a display, a touchscreen, etc.), or any other devices to facilitate user interaction with the mobile device 120. Accordingly, a user may control the mobile device 120 and/or applications on the mobile device 120 via the user interface 122. The example thread data capturer 124 captures thread data corresponding to user actions on the mobile device 120. For example, the thread data capturer 124 may be a component of an application that captures thread data (e.g., task information, task content information, timing information, etc.) corresponding to tasks run in application threads in response to a user action. The example thread data capturer 124 may be implemented using any suitable means and may store thread data corresponding to the user action in the mobile device 120 or may forward the thread data to any other database associated with the mobile device 120 or the thread visualizer 110. In the illustrated example of FIG. 1, the thread data capturer 124 communicates the thread data to the thread visualizer 110 to visualize the thread data in accordance with examples herein. Although the illustrated example of FIG. 1 refers to the mobile device 120, any type of computing device (e.g., a computer, a server, a non-mobile device, etc.) may be implemented in the thread visualization system 100 of FIG. 1.

The example thread visualizer 110 of FIG. 1 visualizes thread data for a duration of a user action in accordance with examples herein. The thread visualizer 110 receives or retrieves the thread data from the thread data capturer 124 of the mobile device 120 for presentation on the display device 130. For example, the thread visualizer 110 presents a duration of a user action on the display device 130 (e.g., a liquid crystal display (LCD), a light emitting diode (LED) display, a touchscreen, etc.) on a thread timeline that includes parallel timelines (including a duration timeline based on the length of the duration of the user action) representative of threads that indicate content of tasks and timing of tasks run within corresponding threads in response to the user action. In the illustrated example of FIG. 1, the thread visualizer 110 may be located on a device (e.g., a computer, a server, etc.) separate from the mobile device 120. In some examples, the thread visualizer 110 and the display device 130 may be collocated on the mobile device 120 (e.g., the display device 130 may be a part of the user interface 122). An example implementation of the thread visualizer 110 is further discussed herein in connections with FIGS. 2 and 3.

Figure 2:
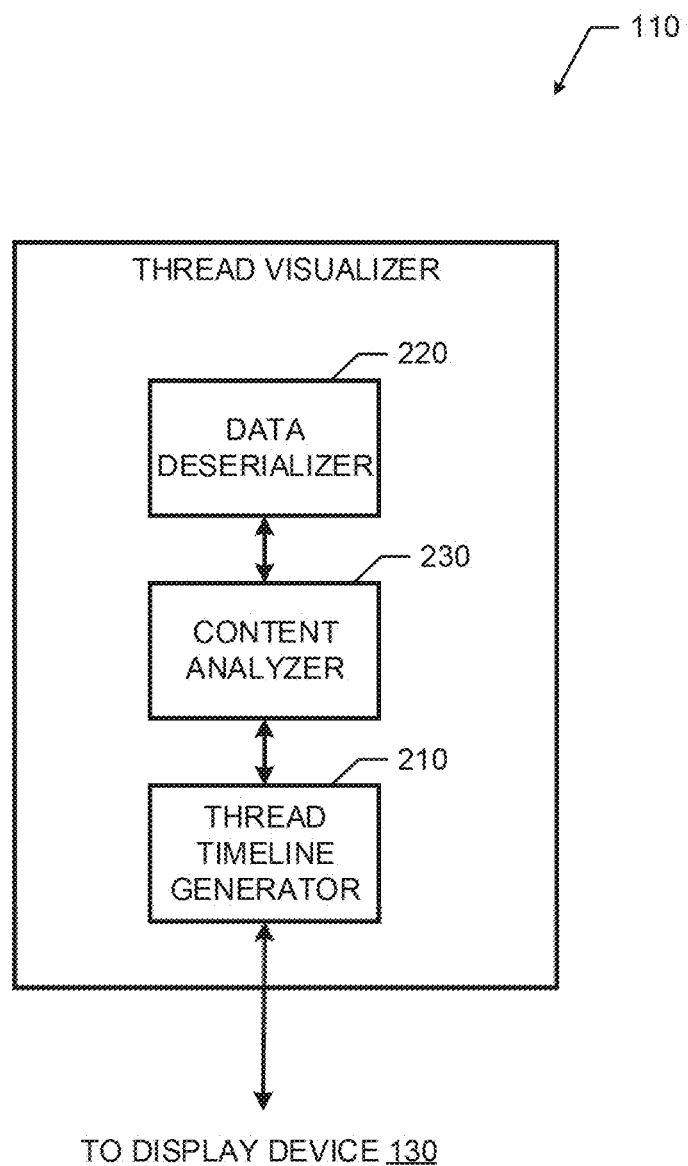
FIG. 2 is a block diagram of an example thread visualizer including a thread timeline generator that may be implemented by the thread visualization system of FIG. 1.

FIG. 2 is a block diagram of an example thread visualizer 110, including a thread timeline generator 210. The example thread visualizer 110 of FIG. 2 may be used to implement the thread visualizer 110 of FIG. 1. The example thread visualizer 110 of FIG. 2 includes the thread timeline generator 210, a data deserializer 220, and a content analyzer 230. In examples disclosed herein, the thread timeline generator 210 generates a thread visualization (e.g., see FIGS. 4A-4D) including a duration timeline and parallel timelines (representative of threads of the application) and content of tasks within threads on the parallel timelines. An example implementation of the thread timeline generator 210 is further discussed in connection with FIG. 3.

The example data deserializer 220 of FIG. 2 receives thread data from the thread data capturer 124 (e.g., via a communication link with the mobile device 120). In some examples, the thread visualizer 110 of FIG. 2 may receive thread data corresponding to a single duration of a user action (e.g., the thread capturer forwards thread data to the thread visualizer after each user action). Additionally or alternatively, the thread visualizer 110 may receive thread data corresponding to multiple durations of a plurality of user actions. In examples disclosed herein, the data deserializer 220 may separate the thread data corresponding to individual durations of user actions. Furthermore, for each duration of a user action identified in the thread data, the data deserializer 220 identifies corresponding threads of the duration utilized in response to the user action. For example, the data deserializer 220 may separate the thread data into thread data corresponding to tasks running on a main thread of the application and thread data corresponding to tasks running on background threads of the application. Accordingly, the data deserializer 220 may identify a number of threads utilized in response to each user action of the thread data and corresponding tasks executed in each of the threads.

The example content analyzer 230 of FIG. 2 analyzes the content of tasks running within each of the threads. For example, the content analyzer 230 may analyze code, objects, text, identifiers, formats, addresses, etc. of the tasks in each of the identified threads to determine the content of the tasks. The example content of the tasks may be any of a network action (e.g., a URL request, an HTTP task, etc.), a blocking action (e.g., sleep, wait, hold, etc.), HyperText Transfer Language (HTML) processing, file reading, database reading, etc. Accordingly, the content analyzer 220 may parse or identify information within the thread data that indicates the content of tasks within the identified threads. In examples herein, using the identified thread and content, the thread timeline generator 210 creates a thread timeline to visualize the thread data.

While an example manner of implementing the thread visualizer 110 of FIG. 1 is illustrated in FIG. 2, at least one of the elements, processes and/or devices illustrated in FIG. 2 may be combined, divided, re-arranged, omitted, eliminated and/or implemented in any other way. Further, the thread timeline generator 210, the data deserializer 220, the content analyzer 230, and/or, more generally, the example thread visualizer 110 of FIG. 2 may be implemented by hardware and/or any combination of hardware and executable instructions (e.g., software and/or firmware). Thus, for example, any of the thread timeline generator 210, the data deserializer 220, the content analyzer 230, and/or, more generally, the example thread visualizer 110 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the thread timeline generator 210, the data deserializer 220, and the content analyzer 230 is/are hereby expressly defined to include a tangible computer readable storage device or storage disk such as a memory, a digital versatile disk (DVD), a compact disk (CD), a Blu-ray disk, etc. storing the executable instructions. Further still, the example thread visualizer 110 of FIG. 2 may include at least one element, process, and/or device in addition to, or instead of, those illustrated in FIG. 2, and/or may include more than one of any or all of the illustrated elements, processes and devices.

Figure 3:
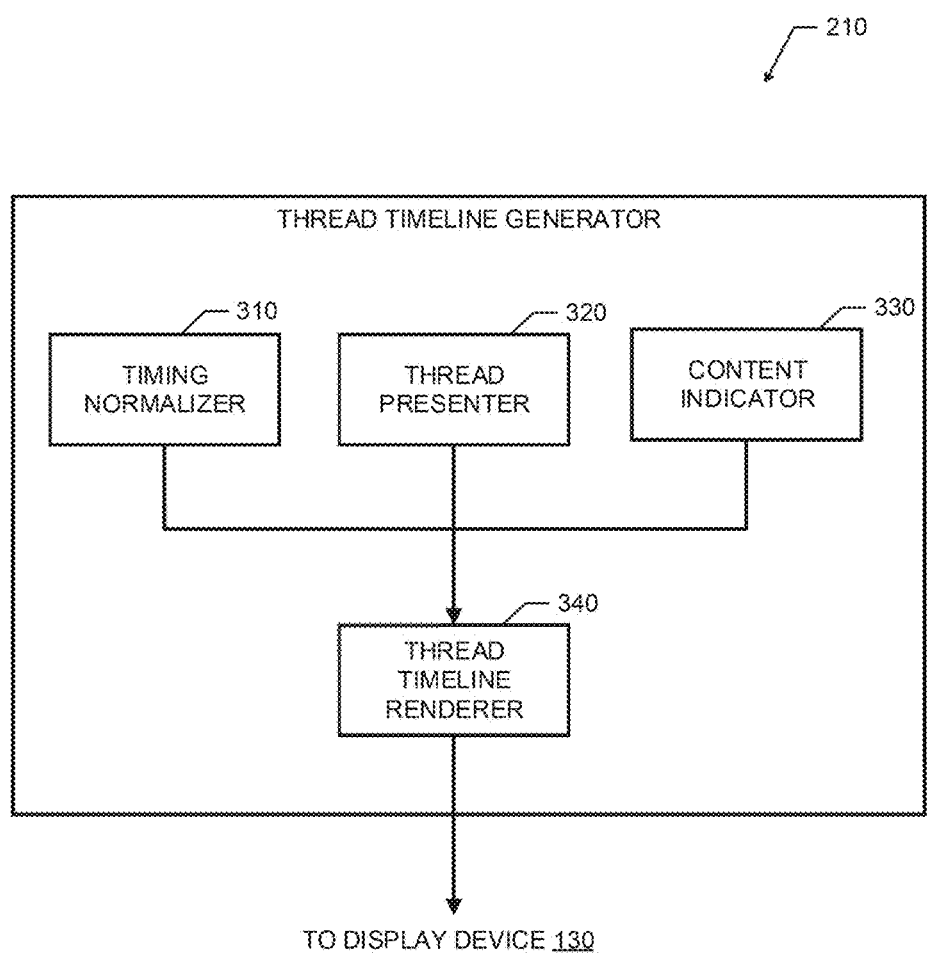
FIG. 3 is a block diagram of an example thread timeline generator that may be used to implement the timeline generator of FIG. 2.

FIG. 3 is a block diagram of an example thread timeline generator 210 that may be used to implement the thread timeline generator 210 of FIG. 2. The example thread timeline generator 210 of FIG. 3 includes a timing normalizer 310, a thread presenter 320, a content indicator 330, and a thread timeline renderer 340. In examples herein, the timing normalizer 310 determines a first dimension of a display (e.g., a width) to represent time, the thread presenter 320 determines a number of rows for threads, the content indicator 330 determines content representations for content in the threads, and the thread timeline renderer 340 renders the thread timeline on the display device 130.

The example timing normalizer 310 of FIG. 3 determines timing of a duration of a user action and normalizes the timing to pixels of a display (e.g., the display 130) for visualization of a thread timeline. For example, the timing normalizer 310 may determine a total length of time (duration) of the user action from thread data corresponding to a main thread of the application and identify a number of pixels for each time unit (e.g., 1 millisecond, 0.1 millisecond, etc.) presented in a first dimension of the visualization and/or the number of pixels of the first dimension based on the characteristics (e.g., size, resolution, etc.) of the display device 130 (or a visualization window if the display device 130). Accordingly, the timing normalizer 130 may determine a duration timeline of the thread timeline corresponding to the first dimension of the visualization. The duration timeline may identify timing of the duration (e.g., beginning, end, length, etc.). The example first dimension may refer to a width or row length in a horizontal visualization (e.g., see FIGS. 4A-4D) or a height or column length in a vertical visualization.

The example thread presenter 320 identifies a number of threads (including the main thread and the background threads) utilized during a duration of a user action in response to the user action. Based on the number of threads, the thread presenter 320 may determine a number of parallel timelines (e.g., parallel rows of a horizontal visualization or parallel columns of a vertical visualization) to be included in the visualization. The example parallel timelines may be synchronized (e.g., aligned by time) with the duration timeline identified by the timing normalizer 310. Accordingly, the thread presenter 320 may determine a second dimension of the visualization based on the number of timelines (e.g., rows or columns), needed to present the visualization on the display device 130. In examples herein, a thickness of each timeline may be adjustable (e.g., based on user input) or fixed (e.g., based on dimensions of a fixed size visualization window or the display 130). Accordingly, the thread presenter 320 may determine a number of pixels for the thickness of each parallel timeline and/or the number of pixels to normalize the second dimension of the visualization based on the number of threads.

The example content indicator 330 of FIG. 3 identifies appropriate locations to present task representations in the visualization from the thread data. For example, the content indicator 330 identifies the timing of the tasks along a first dimension and within which thread the task is run in the second dimension. More specifically, if the visualization presents the main thread in a top row of a horizontal visualization (see FIGS. 4A-4C) and a task occurred 0.5 seconds into the duration on the main thread for 1 second, the content indicator 330 may create a representation (e.g., a block, text, etc.) of the task for presentation in the top row from 0.5 seconds to 1.5 seconds of the timeline. In examples disclosed herein, the content indicator 330 may further indicate content of the task based on the content identified by the content analyzer 230 of FIG. 2. For example, the content indicator 330 may use a color code to identify respective content of tasks (e.g., a first color may be used to identify a network action and a second different color may be used to identify a blocking action).

In some examples, the content indicator 330 may receive/retrieve content information (e.g., names, text, etc.) from the content analyzer 230 corresponding to running tasks, such as universal resource locators (URLs) or hypertext transfer protocol (HTTP) tasks of network actions, triggering tasks of blocking actions (i.e., a task that cause the blocking action), etc. The example content indicator 330 may use identifiers (e.g., text, names, etc.) to indicate the corresponding content information of the tasks in the visualization. For example, the content indicator 330 may include the content information within a block representation in the visualization or a pop-up may include the content information in response to selecting the block representation that includes the content information.

The example thread timeline renderer 340 of FIG. 3, receives display data from the timing normalizer 310, the thread presenter 320, and the content indicator 330 for rendering a visualization of a duration of a user action. Accordingly, the thread timeline renderer 340 may instruct the display device 130 to render the visualization based on the display data. For example, the thread timeline renderer 340 may send signals to pixels (e.g., liquid crystals, LEDs, etc.) of the display device 130 causing the display device 130 to present the visualization of the duration of the user action. In examples herein, the thread timeline renderer 340 may include or render characteristics of the visualization (e.g., labels, titles, etc.) based on user input or information determined from the thread data by the timing normalizer 310, the thread presenter 320, and the content indicator 330.

While an example manner of implementing the thread timeline generator 210 of FIG. 2 is illustrated in FIG. 3, at least one of the elements, processes and/or devices illustrated in FIG. 3 may be combined, divided, re-arranged, omitted, eliminated and/or implemented in any other way. Further, the timing normalizer 310, the thread presenter 320, the content indicator 330, the thread timeline renderer 340 and/or, more generally, the thread timeline generator 210 of FIG. 2 may be implemented by hardware and/or any combination of hardware and executable instructions (e.g., software and/or firmware). Thus, for example, any of the timing normalizer 310, the thread presenter 320, the content indicator 330, the thread timeline renderer 340 and/or, more generally, the thread timeline generator 210 may be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the timing normalizer 310, the thread presenter 320, the content indicator 330, and the thread timeline renderer 340 is/are hereby expressly defined to include a tangible computer readable storage device or storage disk such as a memory, a digital versatile disk (DVD), a compact disk (CD), a Blu-ray disk, etc. storing the executable instructions. Further still, the example thread timeline generator 210 of FIG. 2 may include at least one element, process, and/or device in addition to, or instead of, those illustrated in FIG. 2, and/or may include more than one of any or all of the illustrated elements, processes and devices.

FIGS. 4A-4D illustrate example visualizations that may be generated and presented by the thread visualizer 110 and/or thread timeline generator 210 of FIGS. 2 and/or 3. The example visualization 410 of FIG. 4A visualizes a duration of a simple user action, such as selecting a date using an application. The length time of the duration may be represented by the time axis (TIME) and corresponding time units (e.g., 0.5 seconds) as indicated by the dotted lines. As indicated in the visualization 410 of FIG. 4A, the simple user action causes a plurality of tasks 412 to run in the main thread MAIN (represented by Gray blocks in FIG. 4A), a single task 414 to run in a first background thread B1, and another task 416 to run in a second background thread B2.

Figure 4A:
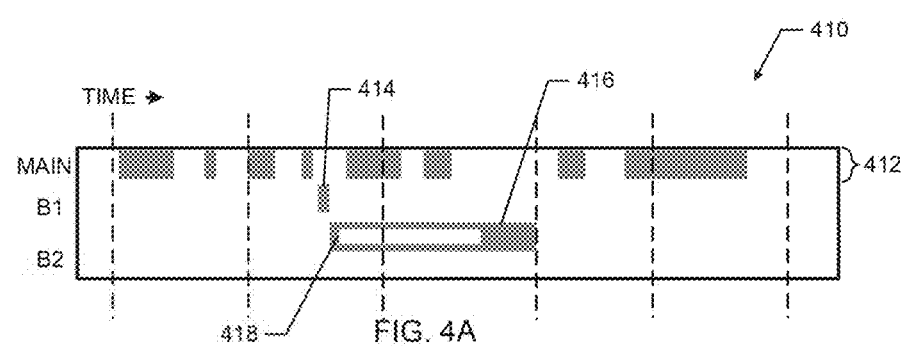
FIGS. 4A-4D illustrate example thread visualizations generated and/or rendered by the timeline generator of FIG. 2 or 3.

In the example of FIG. 4A, the task in the second background thread B2 includes a white indicator 418 to identify the content of that portion of the task. For example, the white indicator 418 may indicate that portion of the task corresponds to a network action.

According to examples herein, to create the visualization 410 of FIG. 4A, the timing normalizer 310 may designate a first dimension (e.g., a time axis, a duration timeline, etc.) of the visualization 410, the thread presenter 320 may generate or designate three parallel timelines corresponding to the three threads MAIN. B1, B2 down a second dimension of the visualization 410, and the content indicator 330 may position the tasks 412, 414, 416 within the corresponding parallel timelines at the appropriate locations based on the timing and the threads of the tasks. In a similar manner, the visualizations of FIGS. 4B-4O may be generated.

Figure 4B:
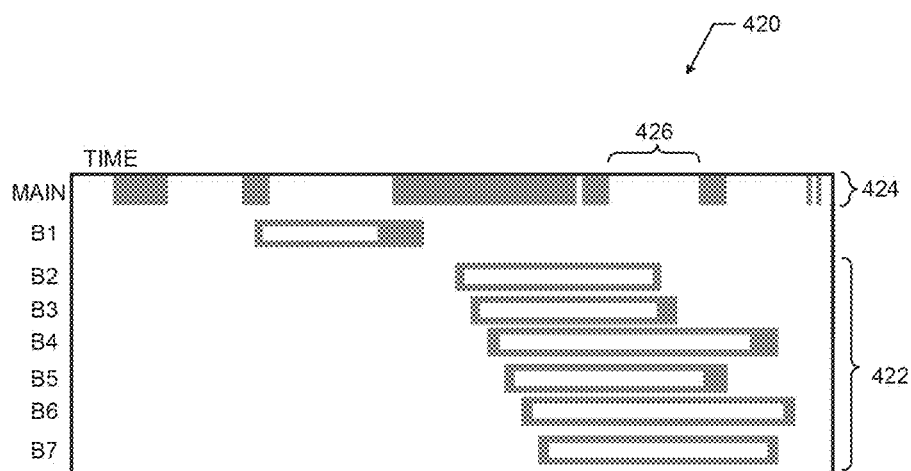

In FIG. 4B, the example visualization 420 indicates that there are a plurality of parallel network actions 422 occurring in background threads B2-B7 in response to a user action (e.g., a filter request). Accordingly, using the visualization 420 of FIG. 4B, a user may determine that a delay in running tasks 424 may be caused by the multiple network actions 422 based on the gap 426 between the tasks 424 during the multiple network actions 422. Such a delay may result in a user interface freeze (e.g., a user action duration that exceeds 1.5 seconds).

Figure 4C:
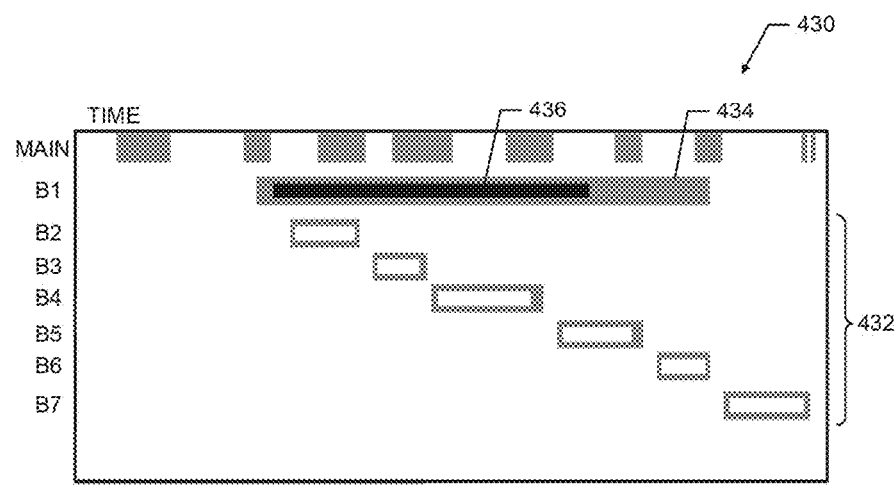
Figure 4D:
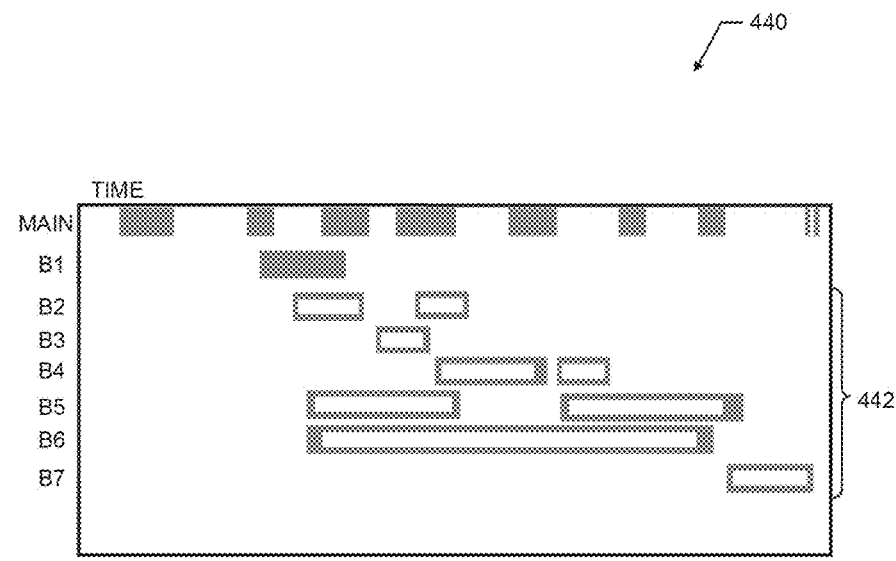

FIG. 4C illustrates an example visualization 430 in which multiple network actions 432 may be subsequently opening in separate threads B2-B7. Considering that these multiple network actions are not occurring in parallel, a user may determine from the visualization 430 that a single thread may be used (e.g., background thread B2) to run the multiple network actions. For example, FIG. 4D illustrates an example visualization 440 of a duration of a user action in an application that utilizes same threads (e.g., B2, 84, 85) for multiple network actions 442. Accordingly, from the visualization 440 of FIG. 4D, the user may determine that there is efficient use of the threads of the application.

Additionally, in the example of FIG. 4C, the user may identify a blocking action 434 occurring in the background thread B2 based on the black indicator 436. The example blocking action may be causing a task to wait until all of the network actions 432 are completed before executing a task on the background thread B1.

Figure 5:
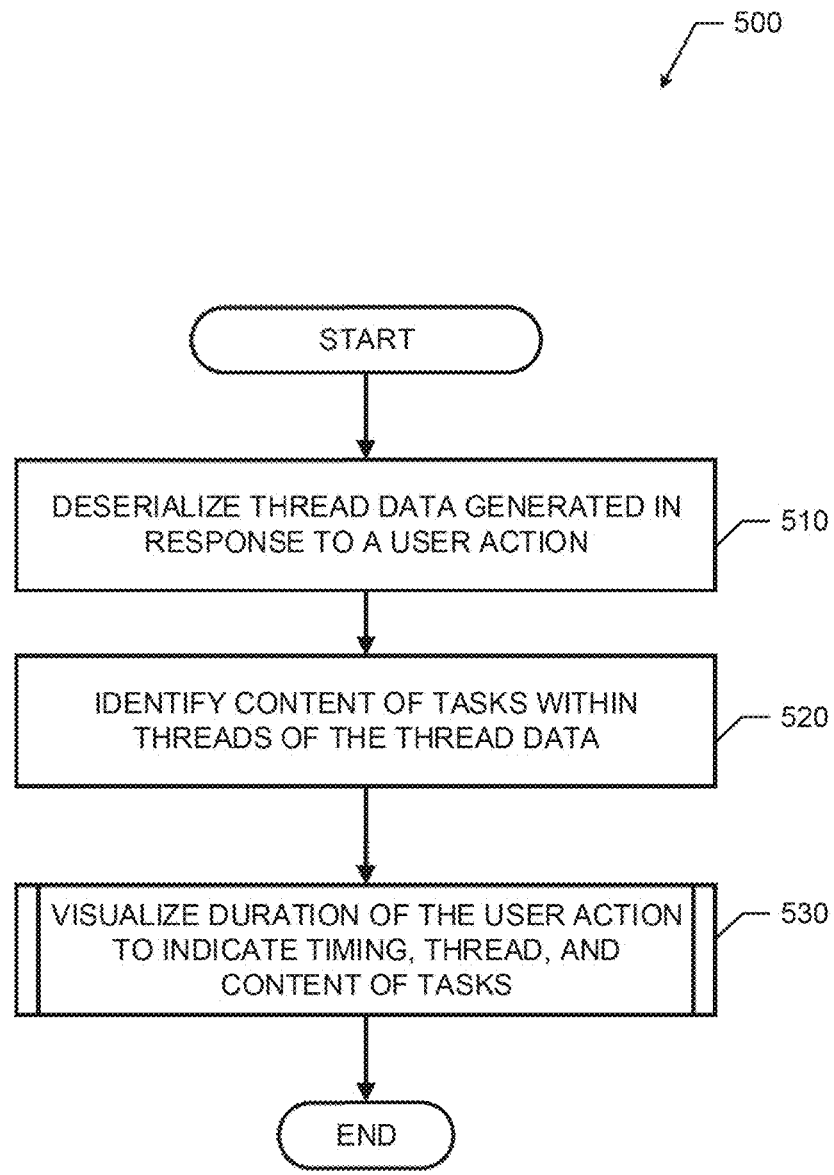
FIG. 5 is a flowchart representative of example machine readable instructions that may be executed to implement the thread visualizer of FIG. 2.

A flowchart representative of example machine readable instructions for implementing the thread visualizer 110 of FIG. 2 is shown in FIG. 5. In this example, the machine readable instructions comprise a program/process for execution by a processor such as the processor 712 shown in the example processor platform 700 discussed below in connection with FIG. 7. The program/process may be embodied in executable instructions (e.g., software) stored on a tangible computer readable storage medium such as a CD-ROM, a floppy disk, a hard drive, a digital versatile disk (DVD), a Blu-ray disk, or a memory associated with the processor 712, but the entire program/process and/or parts thereof could alternatively be executed by a device other than the processor 712 and/or embodied in firmware or dedicated hardware. Further, although the example program is described with reference to the flowchart illustrated in FIG. 5, many other methods of implementing the example thread visualizer 110 may alternatively be used. For example, the order of execution of the blocks may be changed, and/or some of the blocks described may be changed, eliminated, or combined.

The example process 500 of FIG. 5 begins with an initiation of the thread visualizer 110 (e.g., upon startup, upon instructions from a user, upon startup of a device implementing the thread visualizer 110, etc.). The example process 500 of FIG. 5 may be executed to receive/retrieve thread data for a user action associated with an application from a device (e.g., the mobile device 120), analyze the thread data, and visualize a duration of the user action. At block 510, the deserializer 220 of FIG. 2 deserializes thread data generated in response to a user action. For example, at block 510, the deserializer 220 may separate data corresponding to tasks according to threads (e.g., main thread and background threads). In some examples, the deserializer 220 may receive a thread data corresponding to a plurality of user actions and the deserializer 220 may separate the thread data based on the individual user actions.

At block 520 of FIG. 5, the example content analyzer 230 identifies content of the tasks in the thread data. For example, the content analyzer 230 may identify objects, code, addresses, formatting, etc. in the tasks or data associated with the tasks to identify the content of the tasks (e.g., network action, blocking action, HTML processing, etc.). At block 530, the thread timeline generator 210 visualizes the duration of the user action to indicate timing, thread, and content of tasks run in response to the user action. Accordingly, after block 530, a user may use a visualization generated from executing the process 500 of FIG. 5 to identify any issues in application code associated with the thread data. After block 530 the example process 500 ends. In some examples, the process 500 may be iteratively executed to analyze and visualize multiple durations of user actions.

Figure 6:
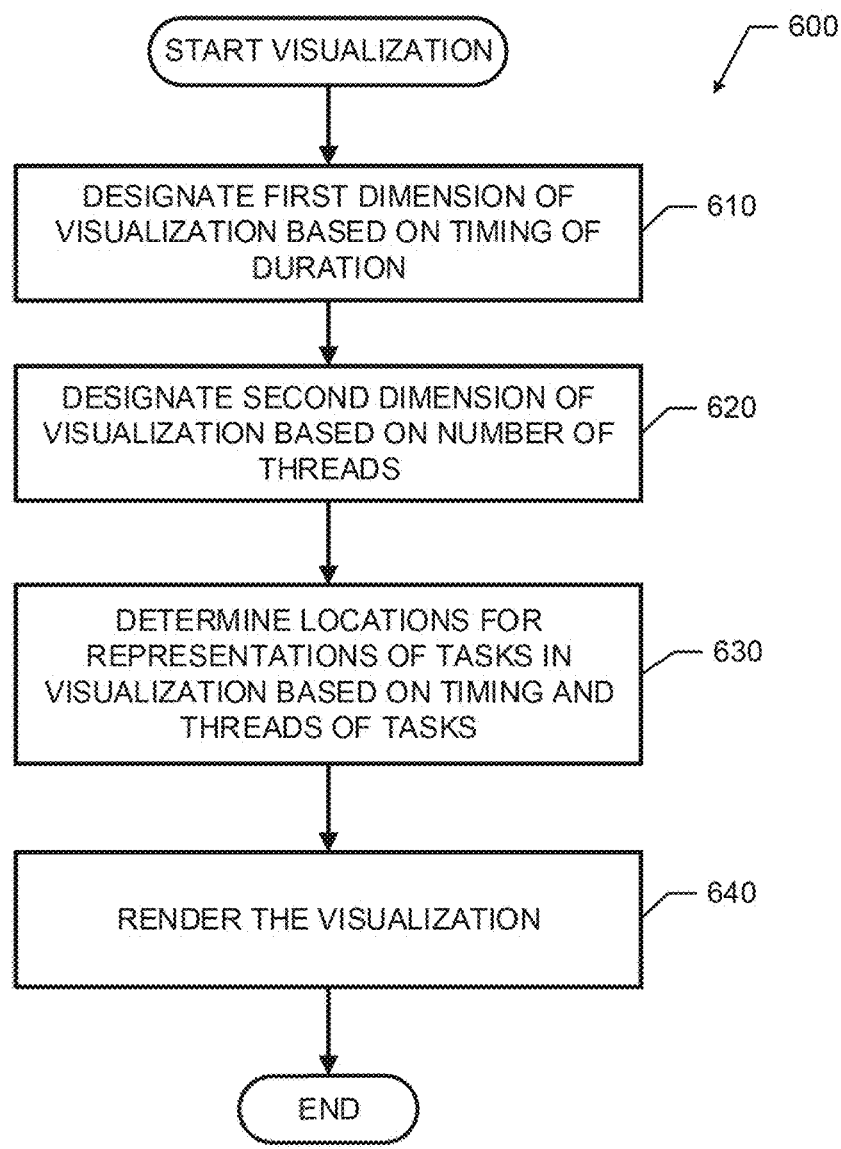
FIG. 6 is a flowchart representative of example machine readable instructions that may be executed to implement the thread timeline generator of FIG. 3.

A flowchart representative of example machine readable instructions for implementing the thread timeline generator 210 of FIG. 3 is shown in FIG. 6. In this example, the machine readable instructions comprise a program/process for execution by a processor such as the processor 712 shown in the example processor platform 700 discussed below in connection with FIG. 7. The program/process may be embodied in executable instructions (e.g., software) stored on a tangible computer readable storage medium such as a CD-ROM, a floppy disk, a hard drive, a digital versatile disk (DVD), a Blu-ray disk, or a memory associated with the processor 712, but the entire program/process and/or parts thereof could alternatively be executed by a device other than the processor 712 and/or embodied in firmware or dedicated hardware. Further, although the example program is described with reference to the flowchart illustrated in FIG. 6, many other methods of implementing the example A1 may alternatively be used. For example, the order of execution of the blocks may be changed, and/or some of the blocks described may be changed, eliminated, or combined.

The example process 600 of FIG. 6 begins with an initiation of the thread timeline generator 210 (e.g., upon startup, upon instructions from a user, upon startup of a device implementing the thread timeline generator 210 (e.g., the thread visualizer 110), etc.). The example process 600 of FIG. 6 may be executed to implement block 530 of FIG. 5.

At block 610 of FIG. 6, the timing normalizer 310 designates a first dimension of a visualization based on timing of a duration of the user action. For example, the timing normalizer 310 may determine a number of pixels per unit of time (e.g., 1 second, 0.5 seconds, etc.) to be used for parallel timelines of the visualization. At block 620, the thread presenter 320 designates a second dimension of the visualization abased on a number of threads identified from thread data corresponding to the duration of the user action. For example, at block 620, the thread presenter 320 may determine a number of threads used to execute tasks in response to the user action, to determine a number of parallel timelines to run down or along the second dimension. Accordingly, based on characteristics of a display (or a window of the display), the dimensions of the visualization may be normalized to the display in accordance with the duration of the user action.

At block 630, the content indicator 330 determines locations for representations (e.g., blocks) of tasks in the visualization based on timing of the tasks and threads of the tasks. In some examples, at block 630, the content indicator 330 determines content of the tasks that may be indicated in the representations of the tasks. At block 640, the thread timeline renderer 340 renders the visualization according to the timing normalizer 310, the thread presenter 320, and the content indicator 330. After block 640, the example process 600 ends.

As mentioned above, the example processes of FIGS. 5 and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 7:
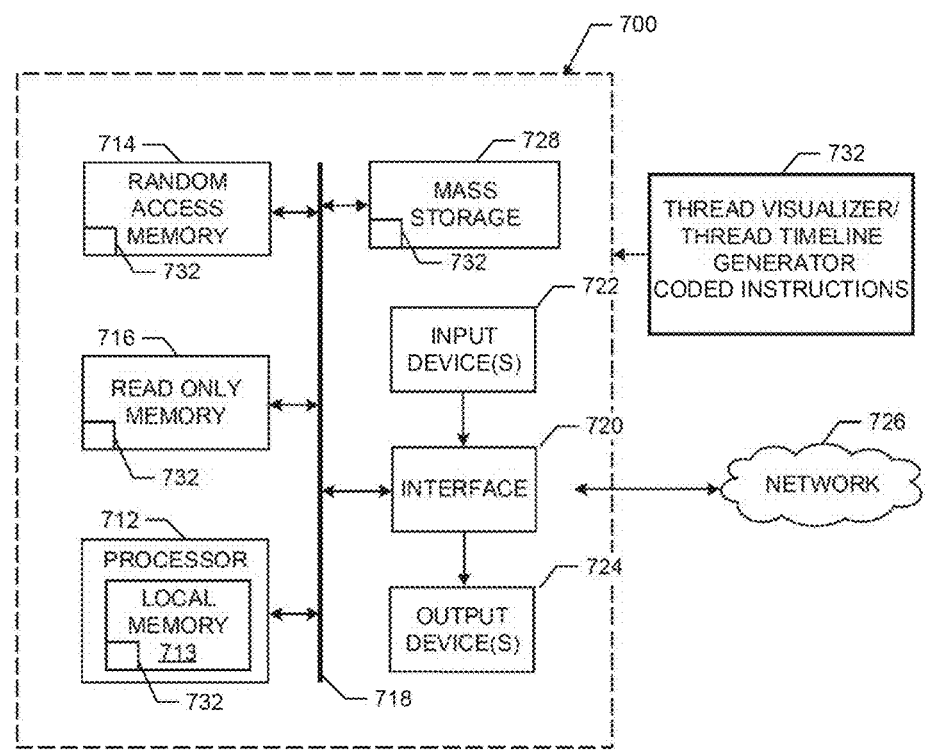
FIG. 7 is a block diagram of an example processor platform capable of executing the instructions of FIGS. 5 and/or 6 to implement the thread visualizer of FIG. 2 and/or the thread timeline generator of FIG. 3.

FIG. 7 is a block diagram of an example processor platform 700 capable of executing the instructions of FIGS. 5 and 6 to implement the thread visualizer 110 of FIG. 2 and/or the thread timeline generator 210 of FIG. 3. The example processor platform 700 may be or may be included in any type of apparatus, such as a server, a personal computer, a mobile device (e.g., a cell phone, a smart phone, a tablet, etc.), a personal digital assistant (PDA), an Internet appliance, or any other type of computing device.

The processor platform 700 of the illustrated example of FIG. 7 includes a processor 712. The processor 712 of the illustrated example is hardware. For example, the processor 712 can be implemented by at least one integrated circuit, logic circuit, microprocessor or controller from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a peripheral component interconnect (PCI) express interface.

In the illustrated example, at least one input device 722 is connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, and/or a voice recognition system.

At least one output device 724 is also connected to the interface circuit 720 of the illustrated example. The output device(s) 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, may include a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes at least one mass storage device 728 for storing executable instructions (e.g., software) and/or data. Examples of such mass storage device(s) 728 include floppy disk drives, hard drive disks, compact disk drives, Blu-ray disk drives, RAID systems, and digital versatile disk (DVD) drives.

The coded instructions 732 of FIGS. 5 and/or 6 may be stored in the mass storage device 728, in the local memory 713 in the volatile memory 714, in the non-volatile memory 716, and/or on a removable tangible computer readable storage medium such as a CD or DVD.

From the foregoing, it will be appreciated that the above disclosed methods, apparatus and articles of manufacture provide a visualization of a duration of a user action of an application. Example visualizations indicate timing of tasks, threads running the tasks, and content of the tasks to enable users (e.g., application developers) to identify issues within code of an application.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. A non-transitory machine readable storage medium comprising instructions that, when executed, cause a machine to at least:
designate a first dimension of a thread visualization based on a duration of a user action, wherein the duration of the user action is a time period beginning at an initiation of a user interaction to request a loading of content in a user interface of an application and ending at completion of the loading of content in the user interface;
designate a second dimension of the thread visualization based on a number of threads of the application utilized for running tasks in response to the user action, the second dimension comprising a number of parallel timelines corresponding to the number of threads;
determine locations for representations of the tasks within the parallel timelines of the thread visualization based on timing of the tasks and the threads running the tasks; and
render the thread visualization on a display, wherein the representations of the tasks in the rendered thread visualization include indications of network actions, indications of blocking actions, and indications of tasks that trigger the blocking actions.

2. The non-transitory machine readable medium of claim 1, wherein the instructions, when executed, further cause the machine to at least:
determine content of the tasks, wherein the representations indicate the respective content of the tasks.

3. The non-transitory machine readable medium of claim 2, wherein the representations comprise color code for the respective tasks.

4. The non-transitory machine readable medium of claim 1, wherein the instructions, when executed, further cause the machine to at least:
designate the first dimension of the thread visualization by normalizing a length of the duration to a number of pixels of the display corresponding to the first dimension.

5. The non-transitory machine readable medium of claim 1, wherein the instructions, when executed, further cause the machine to at least:
designate the second dimension of the thread visualization by allocating the parallel timelines along the second dimension by normalizing the number of threads to a number of pixels for the second dimension of the thread visualization.

6. The non-transitory machine readable medium of claim 1, wherein the instructions, when executed, further cause the machine to at least:
retrieve thread data from a mobile device executing the application; and
determine the timing of the duration and the number of threads from the thread data.

7. An apparatus comprising:
a hardware processor; and
a non-volatile storage medium storing instructions, the instructions executable by the processor to:
determine a duration of a user action, wherein the duration of the user action is a time period beginning at an initiation of a user interaction to request a loading of content in a user interface of an application and ending at completion of the loading of content in the user interface, the user interaction causing the application to run a plurality of tasks in a number of threads of the application;
designate a first dimension of a thread visualization as a duration timeline based on the duration of the user action;
determine a number of threads of the application utilized to run tasks in response to the user action;
designate a number of parallel timelines synchronized with the duration timeline, the number of parallel timelines corresponding to the number threads;
determine a location of representations for the tasks within the thread visualization based on timing of the tasks and the threads running the tasks; and
render the thread visualization on a display device, wherein the representations of the tasks in the rendered thread visualization include indications of network actions, indications of blocking actions, and indications of tasks that trigger the blocking actions.

8. The apparatus of claim 7, wherein the instructions are executable to:
determine content of the tasks; and
generate the representations based on the content of the tasks.

9. The apparatus of claim 7, wherein, in the rendered thread visualization, an indication of a first network action indicates a universal resource locator (URL) of the first network action.

10. The apparatus of claim 9, wherein, in the rendered thread visualization, the indication of the first network action further indicates a hypertext transfer protocol (HTTP) task of the first network action.

11. The apparatus of claim 7, wherein, in the rendered thread visualization, each indication of a network action is rendered in a first color, wherein each indication of a blocking action is rendered in a second color.

12. A method comprising:
designating a first dimension of a thread visualization based on a duration of a user action, wherein the duration of the user action is a time period beginning at an initiation of a user interaction to request a loading of content in a user interface of an application and ending at completion of the loading of content in the user interface;
designating a second dimension of the thread visualization based on a number of threads of the application utilized for running tasks in response to the user action, wherein a number of parallel timelines corresponding to the number of threads are placed along the second dimension;
determine locations for representations of the tasks located within the parallel timelines of the thread visualization based on timing of the tasks and the threads running the tasks, the representations of the tasks indicated based on a color code; and
render the thread visualization on a display device, wherein the representations of the tasks in the rendered thread visualization include indications of network actions, indications of blocking actions, and indications of tasks that trigger the blocking actions.

13. The method of claim 12, wherein, in the rendered thread visualization, an indication of a first network action indicates a universal resource locator (URL) of the first network action.

14. The method of claim 13, wherein, in the rendered thread visualization, an indication of a first network action indicates a hypertext transfer protocol (HTTP) task of the first network action.

15. The method of claim 12, wherein, in the rendered thread visualization, each indication of a network action is rendered in a first color, wherein each indication of a blocking action is rendered in a second color.

16. The method of claim 12, further comprising:
determining a resolution of the display device;
determining, based on the resolution of the display device, a first number of pixels of the display corresponding to the first dimension of the thread visualization; and
designating the first dimension of the thread visualization by normalizing the duration of the user action to the first number of pixels of the display device.

17. The method of claim 16, further comprising:
determining, based on the resolution of the display device, a second number of pixels of the display corresponding to the second dimension of the thread visualization; and
designating the second dimension of the thread visualization by normalizing the number of threads of the application to the second number of pixels of the display device.

18. The apparatus of claim 7, wherein the instructions are executable to:
determine a resolution of the display device;
determine, based on the resolution of the display device, a first number of pixels of the display corresponding to the first dimension of the thread visualization; and
designate the first dimension of the thread visualization by normalizing the duration of the user action to the first number of pixels of the display device.

19. The apparatus of claim 18, wherein the instructions are executable to:
determine, based on the resolution of the display device, a second number of pixels of the display corresponding to the second dimension of the thread visualization; and
designate the second dimension of the thread visualization by normalizing the number of threads of the application to the second number of pixels of the display device.

20. The apparatus of claim 19, wherein the instructions are executable to:
determine a third number of pixels for a thickness of each parallel timeline based on the number of threads of the application and the second number of pixels of the display device.

* * * * *